United States Patent
Yamada (10) Patent No.: US 10,101,646 B2
(45) Date of Patent: Oct. 16, 2018

(54) SEMICONDUCTOR DEVICE, LIGHT EMISSION CONTROL CIRCUIT, AND ELECTRONIC APPLIANCE

(71) Applicant: SEIKO EPSON CORPORATION, Tokyo (JP)

(72) Inventor: Atsushi Yamada, Nagoya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/906,782

(22) Filed: Feb. 27, 2018

(65) Prior Publication Data
US 2018/0267395 A1    Sep. 20, 2018

(30) Foreign Application Priority Data

Mar. 15, 2017    (JP) ................. 2017-049703

(51) Int. Cl.
*G03B 21/00*    (2006.01)
*H05B 37/02*    (2006.01)
(Continued)

(52) U.S. Cl.
CPC ..... *G03B 21/2053* (2013.01); *G03B 21/2033* (2013.01); *H05B 33/0818* (2013.01); *H05B 33/0851* (2013.01); *H05B 37/0209* (2013.01)

(58) Field of Classification Search
CPC ... G09G 2300/0861; G09G 2310/0275; G09G 2310/08; G09G 2300/0426; G09G 2300/0819; G09G 2310/0286; G09G 3/30; G09G 3/3406; G11C 19/28; G11C 19/184; G03B 21/2033; G03B 21/2053; H05B 33/0815; H05B 33/083; H05B 33/0896; H05B 41/2828; H05B 33/0851; Y02B 20/343; Y02B 20/346
See application file for complete search history.

(56) References Cited

U.S. PATENT DOCUMENTS 8,570,456 B2 * 10/2013 Kimura .................. G09G 3/325
                                                  349/38
8,981,443 B2 *  3/2015 Kimura ................ G09G 3/3241
                                                  257/296
(Continued)

FOREIGN PATENT DOCUMENTS

JP    2012-125134 A    6/2012
JP    2015-029399 A    2/2015

*Primary Examiner* — Vibol Tan
(74) *Attorney, Agent, or Firm* — Oliff PLC (57) ABSTRACT

A semiconductor device of the invention is a semiconductor device that controls a transistor that controls an electric current that flows through a light emitting element, the transistor including a gate that is connected to one end of a capacitor. The semiconductor device includes: a first terminal that is connected to the gate of the transistor and the one end of the capacitor; a second terminal that is connected to the other end of the capacitor; a first driving circuit that outputs a first control signal to the first terminal; and a second driving circuit that, in order to control the transistor in an on-state or an off-state, activates or deactivates a second control signal, and outputs the second control signal to the second terminal, the second control signal having a potential lower than a potential of the first control signal.

8 Claims, 6 Drawing Sheets

(51) Int. Cl.
   *G03B 21/20*   (2006.01)
   *H05B 33/08*   (2006.01)

(56) References Cited

U.S. PATENT DOCUMENTS

| | | | |
|---|---|---|---|
| 9,311,876 B2 * | 4/2016 | Umezaki | G11C 19/184 |
| 9,406,699 B2 * | 8/2016 | Umezaki | G02F 1/13624 |
| 9,640,558 B2 * | 5/2017 | Kimura | G09G 3/3241 |
| 2018/0180978 A1 * | 6/2018 | Yamada | G03B 21/2053 |

* cited by examiner

SEMICONDUCTOR DEVICE, LIGHT EMISSION CONTROL CIRCUIT, AND ELECTRONIC APPLIANCE

BACKGROUND

1. Technical Field

The present invention relates to a semiconductor device and a light emission control circuit that control a light emission operation of a light emitting element such as a light emitting diode (LED). Furthermore, the invention also relates to an electronic appliance or the like that includes such a light emission control circuit.

2. Related Art

As techniques for adjusting the brightness level of a light emitting element such as an LED, digital dimming and analog dimming are known. For example, the digital dimming is implemented by adjusting the length of a period in which an electric current flows through the light emitting element by performing control so as to turn on or off a switching transistor connected in series to the light emitting element. On the other hand, the analog dimming is implemented by adjusting the magnitude of an electric current that flows through the light emitting element by controlling a switching power supply or the like that supplies the electric current to the light emitting element.

As a related art, JP-A-2015-29399 discloses a constant current power supply apparatus that is designed to prevent an overshoot at the time of rising of an LED current as a result of an output current being fed back to a switching power supply during an unilluminated period, with the output current being set to zero, when an LED is driven at a constant current by using the switching power supply, and to perform control so as to allow the LED current to flow stably even when the amount of light is reduced, and the pulse width of a PWM signal is small.

In JP-A-2015-29399, an error signal based on a feedback signal generated by a current detection resistor for analog dimming is stored in a capacitor and used during a period in which the LED current does not flow. Accordingly, it can be used as a reference value for determining whether the LED current rises stably, and it is therefore possible to improve the service life and reliability of the LED. However, due to the gate-to-source capacitance of a transistor for digital dimming, the rise time of the gate voltage delays with respect to the PWM signal.

Accordingly, when the pulse width of the PWM signal is small, highly accurate digital dimming cannot be achieved due to the influence of an error in the pulse width. On the other hand, in order to shorten the rise time or the fall time of the gate voltage, if the driving ability of a driving circuit that drives the transistor for digital dimming, or the electric current supplying ability of a regulator that supplies a power supply potential to the driving circuit is increased, noise or electric power consumption increases.

SUMMARY

Thus, in view of the above-described points, a first advantage of some aspects of the invention is to provide a semiconductor device and a light emission control circuit, with which it is possible to achieve highly accurate digital dimming by reducing the rise time or the fall time of the gate voltage of a switching transistor without increasing noise or electric power consumption when a light emitting element is PWM driven for digital dimming. Furthermore, a second advantage of some aspects of the invention is to provide an electronic appliance or the like that includes such a light emission control circuit.

In order to solve at least some of the problems described above, a semiconductor device according to a first aspect of the invention is a semiconductor device that controls a transistor that controls an electric current that flows through a light emitting element, the transistor including a gate that is connected to one end of a capacitor, the semiconductor device including: a first terminal that is connected to the gate of the transistor and the one end of the capacitor; a second terminal that is connected to the other end of the capacitor; a first driving circuit that outputs a first control signal to the first terminal; and a second driving circuit that, in order to control the transistor in an on-state or an off-state, activates or deactivates a second control signal, and outputs the second control signal to the second terminal, the second control signal having a potential lower than a potential of the first control signal.

According to the first aspect of the invention, the second control signal output from the second driving circuit is supplied to the gate of the transistor that controls the electric current that flows through the light emitting element via the capacitor. With this configuration, the waveform of the gate voltage of the switching transistor can be improved without increasing the driving ability of the first driving circuit. It is therefore possible to achieve highly accurate digital dimming by reducing the rise time or the fall time of the gate voltage of the switching transistor without increasing noise or electric power consumption when the light emitting element is PWM driven for digital dimming.

Here, the first driving circuit may activate or deactivate the first control signal in phase with the second control signal. With this configuration, the gate of the transistor that controls the electric current that flows through the light emitting element is driven by the second driving circuit via the capacitor, and is also driven by the first driving circuit in the same phase. Accordingly, the rise time or the fall time of the gate voltage of the switching transistor can be shortened as compared with the configuration in which it is driven by one driving circuit.

In this case, the first driving circuit may generate the first control signal that has an amplitude substantially equal to an amplitude of the second control signal. With this configuration, the rise time or the fall time of the gate voltage of the switching transistor can be shortened while balancing between the driving ability of the first driving circuit and the driving ability of the second driving circuit.

The semiconductor device configured as described above may further include: a third terminal that receives a supply of a first power supply potential; a fourth terminal that receives a supply of a second power supply potential that is lower than the first power supply potential; a first regulator that generates, based on the first power supply potential and the second power supply potential, a third power supply potential that is lower than the first power supply potential but higher than the second power supply potential; and a second regulator that generates, based on the first power supply potential and the second power supply potential, a fourth power supply potential that is lower than the third power supply potential but higher than the second power supply potential, wherein the first driving circuit includes a first level shifter that shifts a level of an input signal, and generates an output signal that transitions between the first power supply potential and the third power supply potential, and a first output circuit that generates the first control signal based on the output signal of the first level shifter, and outputs the first control signal to the first terminal, and the second driving circuit includes a second level shifter that shifts the level of the input signal, and generates an output signal that transitions between the fourth power supply potential and the second power supply potential, and a second output circuit that generates the second control signal based on the output signal of the second level shifter, and outputs the second control signal to the second terminal.

By providing the first and second regulators as described above, the amplitudes of the first and second control signals can be set within an appropriate range. Also, by supplying the first power supply potential from the third terminal to the first driving circuit without passing through a regulator, and supplying the second power supply potential from the fourth terminal to the second driving circuit without passing through a regulator, it is possible to form a steep rise waveform of the first control signal, and also form a steep fall waveform of the second control signal.

A light emission control circuit according to a second aspect of the invention includes: a transistor that controls an electric current that flows through a light emitting element; a capacitor that includes one end connected to a gate of the transistor, and has a capacitance larger than a capacitance of the gate of the transistor; and any one of the semiconductor devices described above that controls the transistor. According to the second aspect of the invention, the second control signal generated by the second driving circuit can be supplied efficiently to the gate of the switching transistor.

A light emission control circuit according to a third aspect of the invention includes: a first transistor that controls an electric current that flows through a first light emitting element; a first capacitor that includes one end connected to a gate of the first transistor; a first semiconductor device that controls the first transistor and is any one of the semiconductor devices described above; a second transistor that controls an electric current that flows through a second light emitting element; a second capacitor that includes one end connected to a gate of the second transistor; and a second semiconductor device that controls the second transistor and is any one of the semiconductor devices described above, wherein one of the first semiconductor device and the second semiconductor device includes: a first regulator that generates, based on a first power supply potential and a second power supply potential, a third power supply potential that is lower than the first power supply potential but higher than the second power supply potential, and supplies the third power supply potential to the first driving circuit of the first semiconductor device and the first driving circuit of the second semiconductor device; and a second regulator that generates, based on the first power supply potential and the second power supply potential, a fourth power supply potential that is lower than the third power supply potential but higher than the second power supply potential, and supplies the fourth power supply potential to the second driving circuit of the first semiconductor device and the second driving circuit of the second semiconductor device.

According to the third aspect of the invention, in the light emission control circuit that includes a plurality of semiconductor devices for controlling the light emission operations of a plurality of light emitting elements, the third and fourth power supply potentials that are respectively generated by the first and second regulators of one semiconductor device are shared among the plurality of semiconductor devices, and therefore the third and fourth power supply potentials used in the plurality of semiconductor devices can be uniform, and reduce the number of capacitors that smooth the third and fourth power supply potentials.

An electronic appliance according to a fourth aspect of the invention includes: a light emitting element, or a first light emitting element and a second light emitting element; and the light emission control circuit according to the second or third aspect of the invention that controls a light emission operation of the light emitting element, or light emission operations of the first light emitting element and the second light emitting element. According to the fourth aspect of the invention, it is possible to provide an electronic appliance that can accurately adjust the brightness level of the light emitting element by using the light emission control circuit that can achieve highly accurate digital dimming without increasing noise or electric power consumption when the light emitting element is PWM driven for digital dimming.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments according to the invention will be described in detail with reference to the drawings. The same constituent elements are given the same reference numerals, and a redundant description will be omitted.

Light Emission Control Circuit

Figure 1:
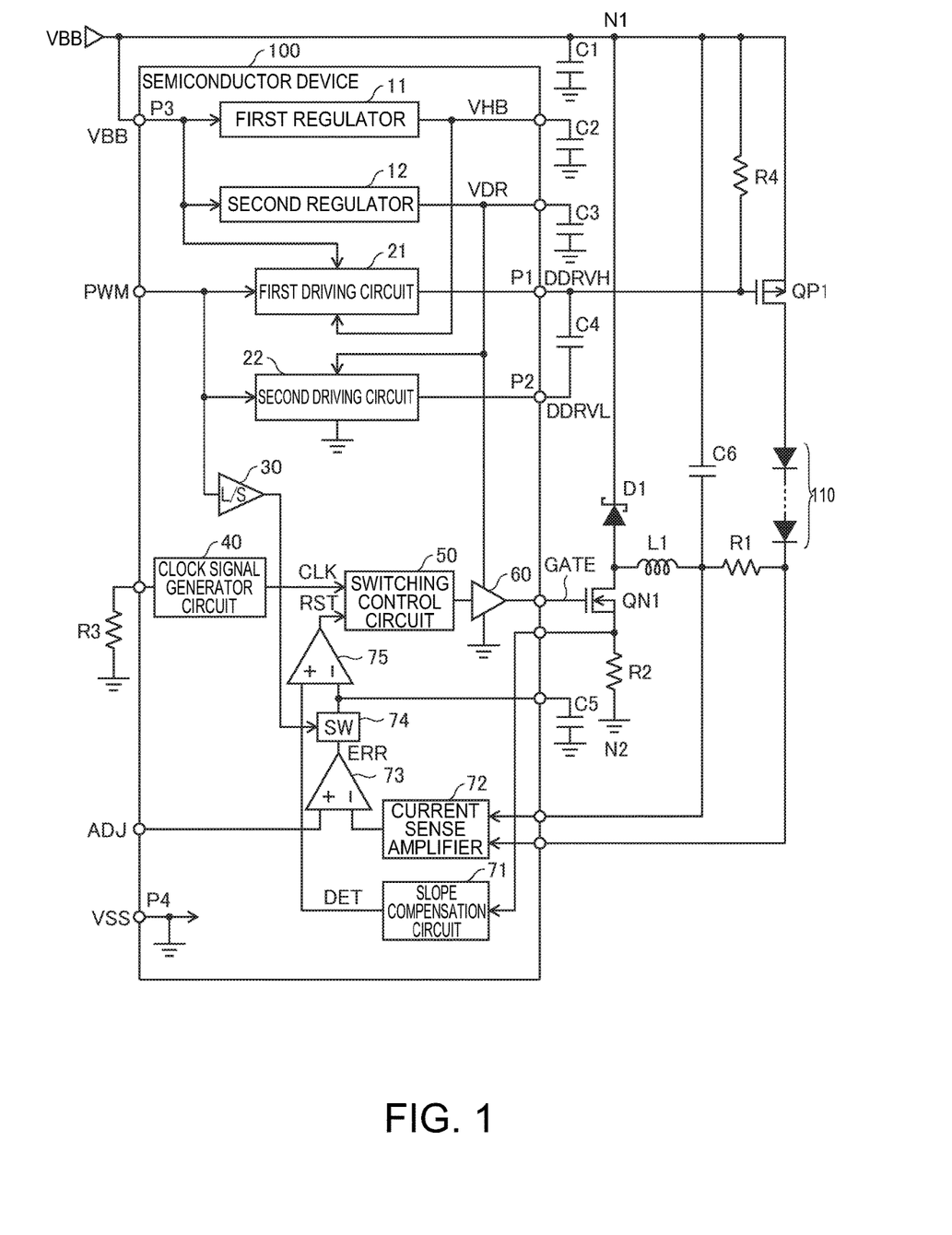
FIG. 1 is a circuit diagram of a light emission control circuit that includes a semiconductor device according to embodiments of the invention.

FIG. 1 is a circuit diagram showing a configuration example of a light emission control circuit that includes a semiconductor device according to an embodiment of the invention. As shown in FIG. 1, the light emission control circuit includes a semiconductor device 100, a P-channel MOS transistor QP1, an N-channel MOS transistor QN1, a diode D1, resistors R1 to R4, capacitors C1 to C6, and an inductor L1. The light emission control circuit controls the light emission operation of a light emitting element 110. The light emitting element 110 includes, for example, at least one light emitting diode (LED), laser diode or the like, and emits light at a brightness level according to the magnitude of a supplied electric current.

In the light emission control circuit, a first power supply potential VBB that is on the high potential side is supplied to a first node N1, and a second power supply potential VSS that is on the low potential side is supplied to a second node N2. FIG. 1 shows an example in which the second power supply potential VSS is a ground potential (0 V). The transistor QP1, the light emitting element 110, the resistor R1, the inductor L1, the transistor QN1, and the resistor R2 are connected in series between the first node N1 and the second node N2. Here, the transistor QP1 corresponds to a switching transistor of a high side switch, and the transistor QN1 corresponds to a switching transistor of a low side switch.

The transistor QP1 is provided for digital dimming, and performs control so as to switch an electric current that flows through the light emitting element 110 that is connected between the first node N1 and one end of the inductor L1 between on and off. In the example shown in FIG. 1, the transistor QP1 includes a source that is connected to the first node N1, a drain that is connected to the light emitting element 110, and a gate that is connected to one end of the capacitor C4. Also, the resistor R4 that has a high resistance value (for example, 100 kΩ) is connected between the first node N1 and the gate of the transistor QP1.

The gate of the transistor QP1 receives a supply of a first control signal DDRVH, and also receives a supply of a second control signal DDRVL via the capacitor C4. Accordingly, the first control signal DDRVH and an alternating component of the second control signal DDRVL are combined, and a gate voltage of the transistor QP1 is thereby generated.

The transistor QP1 is in an on-state while the gate voltage is activated to a low level, and is in an off-state while the gate voltage is deactivated to a high level. As a result of the gate voltage being alternately activated and deactivated, the transistor QP1 performs a switching operation. The resistor R1 is connected between the light emitting element 110 and one end of the inductor L1, and is used to detect an electric current that flows through the transistor QP1 and the light emitting element 110.

The transistor QN1 is provided for analog dimming, and performs control so as to switch an electric current that flows from the other end of the inductor L1 to the second node N2 between on and off. In the example shown in FIG. 1, the transistor QN1 includes a drain that is connected to the other end of the inductor L1, a source that is connected to the second node N2 via the resistor R2, and a gate that receives a supply of a third control signal GATE.

The transistor QN1 is in an on-state while the third control signal GATE is activated to a high level, and is in an off-state while the third control signal GATE is deactivated to a low level. As a result of the third control signal GATE being alternately activated and deactivated, the transistor QN1 performs a switching operation. The resistor R2 is connected between the source of the transistor QN1 and the second node N2, and is used to detect an electric current that flows through the transistor QN1.

The diode D1 is connected between the other end of the inductor L1 and the first node N1, and includes an anode connected to the other end of the inductor L1, and a cathode connected to the first node N1. As the diode D1, it is possible to use, for example, a Schottky barrier diode or the like that has a lower forward voltage and a higher switching speed as compared with a PN junction diode.

The capacitor C1 is connected between the first node N1 and the second node N2, and smoothes a power supply voltage (VDD-VSS). The capacitor C6 is connected between the first node N1 and one end of the inductor L1, and smoothes a step-down voltage that is obtained by stepping down the power supply voltage (VDD-VSS) by the switching operation of the transistor QN1.

For digital dimming, an N-channel MOS transistor may be used instead of the P-channel MOS transistor QP1. In this case, the N-channel MOS transistor for digital dimming may be connected on the second node N2 side with respect to the light emitting element 110, and the inductor L1, the diode D1, the capacitor C6, and the transistor QN1 for analog dimming may be connected on the first node N1 side with respect to the light emitting element 110.

Also, as the element that performs a switching operation, other than MOS transistors, it is also possible to use a bipolar transistor, an insulated gate bipolar transistor (IGBT), or the like. In the present application, in the case where a bipolar transistor is used, the term "gate" can be replaced by "base", the term "source" can be replaced by "emitter", and the term "drain" can be replaced by "collector". Likewise, in the case where an IGBT is used, the term "source" can be replaced by "emitter", the term "drain" can be replaced by "collector".

Semiconductor Device

As shown in FIG. 1, the semiconductor device 100 includes a first regulator 11, a second regulator 12, a first driving circuit 21, a second driving circuit 22, a level shifter 30, a clock signal generator circuit 40, a switching control circuit 50, a drive circuit 60, and a slope compensation circuit 71, a current sense amplifier 72, an operational amplifier 73, a switch circuit 74, and a comparator 75 that are provided in a feedback loop of the switching control circuit 50. The diode D1, the resistor R1, and the like may be incorporated into the semiconductor device 100.

Also, the semiconductor device 100 includes a first terminal P1 that is connected to the gate of the transistor QP1 and one end of the capacitor C4, a second terminal P2 that is connected to the other end of the capacitor C4, a third terminal P3 that receives a supply of the first power supply potential VBB, and a fourth terminal P4 that receives a supply of the second power supply potential VSS that is lower than the first power supply potential VBB.

The semiconductor device 100 receives a supply of a digital dimming signal (pulse width modulation signal) PWM and an analog dimming signal (current value adjustment signal) ADJ from an external microcomputer or the like, and controls the transistor QP1 for digital dimming and the transistor QN1 for analog dimming.

The first regulator 11 generates a third power supply potential VHB (for example, 37.5 V) that is lower than the first power supply potential VBB but higher than the second power supply potential VSS based on the first power supply potential VBB (for example, 45 V) and the second power supply potential VSS (for example, 0 V). The capacitor C2 is connected between an output terminal of the first regulator 11 and the second node N2, and smoothes a power supply voltage (VHB−VSS).

The second regulator 12 generates a fourth power supply potential VDR (for example, 7.5 V) that is lower than the third power supply potential VHB but higher than the second power supply potential VSS based on the first power supply potential VBB and the second power supply potential VSS. The capacitor C3 is connected between an output terminal of the second regulator 12 and the second node N2, and smoothes a power supply voltage (VDR-VSS).

The third power supply potential VHB generated by the first regulator 11 is supplied to the first driving circuit 21 and the like, and the fourth power supply potential VDR generated by the second regulator 12 is supplied to the second driving circuit 22 and the like. Also, although not shown in FIG. 1, the semiconductor device 100 includes a regulator or the like that generates a power supply potential VDL (for example, 3.3V) for a logic circuit based on the first power supply potential VBB and the second power supply potential VSS.

The first driving circuit 21 outputs a first control signal DDRVH to the first terminal P1. The first control signal DDRVH is supplied from the first terminal P1 to the gate of the transistor QP1. The second driving circuit 22 activates or deactivates a second control signal DDRVL, and outputs the second control signal DDRVL to the second terminal P2 so as to control the transistor QP1 in an on-state or an off-state according to the digital dimming signal PWM, the second control signal DDRVL having a potential lower than the potential of the first control signal DDRVH. The second control signal DDRVL is supplied from the second terminal P2 to the gate of the transistor QP1 via the capacitor C4.

The capacitor C4 has a capacitance larger than that of the gate of the transistor QP1. With this configuration, the second control signal DDRVL generated by the second driving circuit 22 can be efficiently supplied to the gate of the transistor QP1. The capacitance of the capacitor C4 is larger than that of the gate of the transistor QP1 preferably by a factor of 10 or more, and more preferably by a factor of 100 or more. If, for example, the gate of the transistor QP1 has a capacitance of 1000 µF, the capacitor C4 has a capacitance of preferably 0.01 µF or more, and more preferably 0.1 µF or more.

The transistor QP1 is turned on while the digital dimming signal PWM is activated, and an electric current flows through the light emitting element 110. On the other hand, the transistor QP1 is turned off while the digital dimming signal PWM is deactivated, and an electric current does not flow through the light emitting element 110. Accordingly, digital dimming can be performed by changing the duty ratio of the digital dimming signal PWM so as to change the period in which an electric current flows through the light emitting element 110.

Also, the level shifter (L/S) 30 shifts the potential of the digital dimming signal PWM to a potential appropriate for an internal circuit of the semiconductor device 100. The clock signal generator circuit 40 includes, for example, a CR oscillator circuit or the like, and generates a clock signal CLK that has a predetermined frequency by performing an oscillation operation. The oscillation frequency of the CR oscillator circuit is determined by a time constant that is a product of the capacitance value of the capacitor and the resistance value of the resistor. In order to adjust the oscillation frequency of the CR oscillator circuit, the resistor R3 is externally attached to the semiconductor device 100.

The switching control circuit 50 generates a third control signal GATE for controlling the transistor QN1 based on the clock signal CLK and a reset signal RST. The third control signal GATE is supplied to the gate of the transistor QN1 via the drive circuit 60 that is a buffer circuit or the like.

When the transistors QP1 and QN1 are in an on-state, an electric current flows from the first node N1 to the second node N2 via the light emitting element 110, the inductor L1 and the like, and electric energy is converted into magnetic energy and accumulated in the inductor L1. Also, when the transistor QN1 is turned off while the transistor QP1 is in an on-state, the magnetic energy accumulated in the inductor L1 is discharged in the form of electric energy, and an electric current flows through the light emitting element 110, the diode D1 and the like.

The slope compensation circuit 71 generates a detection signal DET by adding a bias voltage to a terminal-to-terminal voltage of the resistor R2 for current detection, and supplies the detection signal DET to a non-inverting input terminal of the comparator 75. The current sense amplifier 72 amplifies a terminal-to-terminal voltage of the resistor R1 for current detection, and supplies the terminal-to-terminal voltage to an inverting input terminal of the operational amplifier 73. The analog dimming signal ADJ is supplied to a non-inverting input terminal of the operational amplifier 73. The operational amplifier 73 generates an error signal ERR by amplifying the difference between the voltage of the analog dimming signal ADJ and the output voltage of the current sense amplifier 72, and supplies the error signal ERR to the switch circuit 74.

The switch circuit 74 is, for example, an analog switch or the like, and is turned on while the digital dimming signal PWM supplied from the level shifter 30 is activated, and is turned off while the digital dimming signal PWM is deactivated. With this configuration, the voltage of the error signal ERR generated while the transistor QP1 is in an on-state is stored in the capacitor C5, and supplied to an inverting input terminal of the comparator 75. The comparator 75 compares the voltage of the detection signal DET with the voltage of the error signal ERR stored in the capacitor C5, generates a reset signal RST according to the result of comparison, and supplies the reset signal RST to the switching control circuit 50.

The switching control circuit 50 activates the third control signal GATE to a high level in synchronization with the rising of the clock signal CLK. As a result, the transistor QN1 is turned on, and when the transistor QP1 is in an on-state, an electric current flows from the first node N1 to the resistor R2 for current detection via the light emitting element 110, the inductor L1 and the like.

Along with an increase in the electric current that flows through the resistor R2, the voltage of the detection signal DET also increases. If the voltage of the detection signal DET exceeds the voltage of the error signal ERR stored in the capacitor C5, the comparator 75 activates the reset signal RST to a high level. As a result, the third control signal GATE is deactivated to a low level, and the transistor QN1 is turned off.

With such feedback control, if the voltage of the analog dimming signal ADJ increases, the on-duty ratio of the third control signal GATE increases, which increases the period in which the transistor QN1 is in an on-state, and increases the electric current that flows through the light emitting element 110. Accordingly, analog dimming can be performed by changing the voltage of the analog dimming signal ADJ so as to change the electric current that flows through the light emitting element 110. On the other hand, an electric current does not flow through the light emitting element 110 while the transistor QP1 is in an off-state.

First Embodiment

In a first embodiment, the first driving circuit 21 activates or deactivates the first control signal DDRVH based on the digital dimming signal PWM in phase with the second control signal DDRVL. With this configuration, the gate of the transistor QP1 that controls the electric current that flows through the light emitting element 110 is driven by the second driving circuit 22 via the capacitor C4, and also driven by the first driving circuit 21 in the same phase. Accordingly, the rise time or the fall time of the gate voltage of the transistor QP1 can be shortened as compared with the configuration in which it is driven by one driving circuit. Although there is a possibility that one of the first control signal DDRVH and the second control signal DDRVL might delay with respect to the other due to the parasitic capacitance of a transmission path or the like, such a phase difference is permissible.

Figure 2:
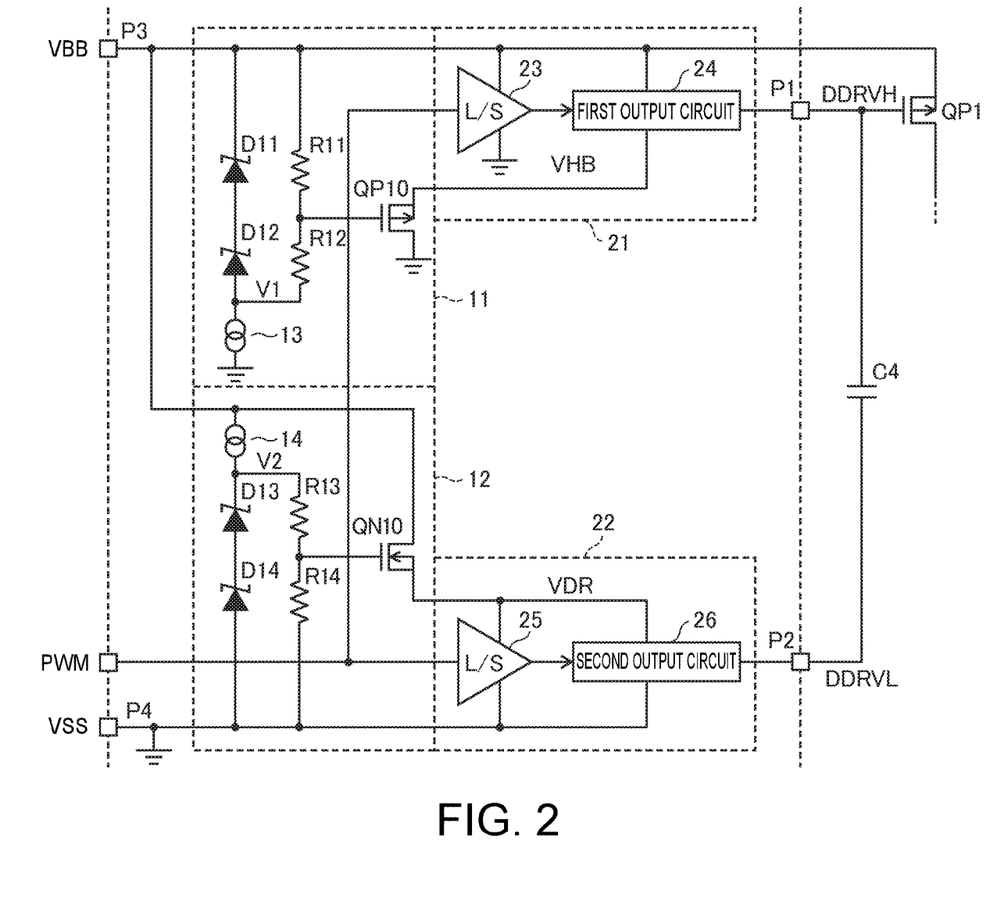
FIG. 2 is a circuit diagram showing a configuration example of a portion of a semiconductor device according to a first embodiment of the invention.

FIG. 2 is a circuit diagram showing a configuration example of a portion of a semiconductor device according to the first embodiment of the invention. As shown in FIG. 2, the first regulator 11 includes Zener diodes D11 and D12, a constant current supply 13, resistors R11 and R12, and a P-channel MOS transistor QP10.

The Zener diodes D11 and D12, and the constant current supply 13 are connected in series between wiring of the first power supply potential VBB and wiring of the second power supply potential VSS, and a potential V1 is generated at an anode of the Zener diode D12. The resistors R11 and R12 divide the voltage between the first power supply potential VBB and the potential V1, and generate a gate voltage of the transistor QP10. The transistor QP10 includes a drain that is connected to the wiring of the second power supply potential VSS, and generates a third power supply potential VHB at its source according to the gate voltage.

Likewise, the second regulator 12 includes Zener diodes D13 and D14, a constant current supply 14, resistors R13 and R14, and an N-channel MOS transistor QN10.

The constant current supply 14, and the Zener diodes D13 and D14 are connected in series between the wiring of the first power supply potential VBB and the wiring of the second power supply potential VSS, and generates a potential V2 at a cathode of the Zener diode D13. The resistors R13 and R14 divide the voltage between the potential V2 and the second power supply potential VSS, and generate a gate voltage of the transistor QN10. The transistor QN10 includes a drain that is connected to the wiring of the first power supply potential VBB, and generates a fourth power supply potential VDR at its source according to the gate voltage.

The first driving circuit 21 includes a first level shifter (L/S) 23 and a first output circuit 24. The first level shifter 23 receives an input of a digital dimming signal PWM, shifts the level of the input signal, and generates an output signal that transitions between the first power supply potential VBB and the third power supply potential VHB. The first output circuit 24 generates a first control signal DDRVH based on the output signal of the first level shifter 23, and outputs the first control signal DDRVH to the first terminal P1.

The second driving circuit 22 includes a second level shifter (US) 25 and a second output circuit 26. The second level shifter 25 receives an input of the digital dimming signal PWM, shifts the level of the input signal, and generates an output signal that transitions between the fourth power supply potential VDR and the second power supply potential VSS. The second output circuit 26 generates a second control signal DDRVL based on the output signal of the second level shifter 25, and outputs the second control signal DDRVL to the second terminal P2.

As described above, by providing the first regulator 11 and the second regulator 12, the amplitudes of the first control signal DDRVH and the second control signal DDRVL can be set within an appropriate range. Also, by supplying the first power supply potential VBB from the third terminal P3 to the first driving circuit 21 without passing through a regulator, and supplying the second power supply potential VSS from the fourth terminal P4 to the second driving circuit 22 without passing through a regulator, it is possible to form a steep rise waveform of the first control signal DDRVH, and also form a steep fall waveform of the second control signal DDRVL.

Here, the first driving circuit 21 may generate a first control signal DDRVH that has an amplitude substantially equal to the amplitude of the second control signal DDRVL. With this configuration, the rise time or the fall time of the gate voltage of the transistor QP1 can be shortened while balancing between the driving ability of the first driving circuit 21 and the driving ability of the second driving circuit 22. In this case, the first power supply potential VBB, the second power supply potential VSS, the third power supply potential VHB, and the fourth power supply potential VDR satisfy a relationship represented by the following expression (1).

$$(VBB-VHB) \cong (VDR-VSS) \qquad (1)$$

In the case of performing control so as to turn on the transistor QP1, the first driving circuit 21 generates a first control signal DDRVH that is at a low level and substantially equal to the third power supply potential VHB, and supplies the first control signal DDRVH to the gate of the transistor QP1. Also, the second driving circuit 22 generates a second control signal DDRVL that is at a low level and substantially equal to the second power supply potential VSS, and supplies the second control signal DDRVL to the gate of the transistor QP1 via the capacitor C4. With this configuration, the gate-to-source voltage (absolute value) of the transistor QP1 becomes larger than a threshold voltage.

On the other hand, in the case of performing control so as to turn off the transistor QP1, the first driving circuit 21 generates a first control signal DDRVH that is at a high level and substantially equal to the first power supply potential VBB, and supplies the first control signal DDRVH to the gate of the transistor QP1. Also, the second driving circuit 22 generates a second control signal DDRVL that is at a high level and substantially equal to the fourth power supply potential VDR, and supplies the second control signal DDRVL to the gate via the capacitor C4. With this configuration, the gate-to-source voltage of the transistor QP1 becomes substantially zero.

Alternatively, taking into consideration a reduction in the alternating voltage caused by interposing the capacitor C4, the second driving circuit 22 may generate a second control signal DDRVL that has an amplitude greater than or equal to the amplitude of the first control signal DDRVH. In this case, the first power supply potential VBB, the second power supply potential VSS, the third power supply potential VHB, and the fourth power supply potential VDR satisfy a relationship represented by the following expression (2).

$$(VBB-VHB) \le (VDR-VSS) \qquad (2)$$

Figure 3:
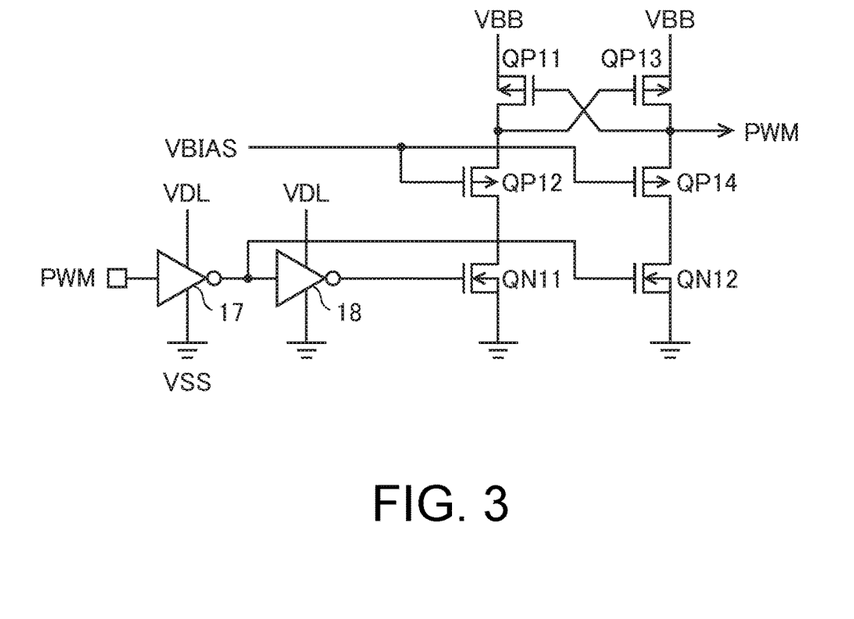
FIG. 3 is a circuit diagram showing a configuration example of a first level shifter shown in FIG. 2.

FIG. 3 is a circuit diagram showing a configuration example of the first level shifter shown in FIG. 2. As shown in FIG. 3, the first level shifter 23 includes inverters 17 and 18, P-channel MOS transistors QP11 to QP14, and N-channel MOS transistors QN11 and QN12.

The transistors QP11 and QP12, and the transistor QN11 are connected in series between the wiring of the first power supply potential VBB and the wiring of the second power supply potential VSS. The transistors QP13 and QP14, and the transistor QN12 are connected in series between the wiring of the first power supply potential VBB and the wiring of the second power supply potential VSS.

The gate of the transistor QP11 is connected to the drain of the transistor QP13 and the source of the transistor QP14, and the gate of the transistor QP13 is connected to the drain of the transistor QP11 and the source of the transistor QP12.

A predetermined bias potential VBIAS is applied to the gates of the transistors QP12 and QP14. An output signal of the inverter 18 is supplied to the gate of the transistor QN11, and an output signal of the inverter 17 is supplied to the gate of the transistor QN12.

Each of the inverters 17 and 18 performs operation by receiving a supply of a power supply potential VDL for a logic circuit and the second power supply potential VSS, inverts the input signal, and generates an output signal. The transistor QN11 is turned on or off according to the output signal of the inverter 18, and the transistor QN12 is turned on or off according to the output signal of the inverter 17.

For example, when the digital dimming signal PWM is shifted to a high level, the output signal of the inverter 17 is shifted to a low level, and the output signal of the inverter 18 is shifted to a high level. As a result, the transistor QN11 is turned on, and the transistor QN12 is turned off. Accordingly, the transistors QP12 and QP13 are turned on, and the transistors QP14 and QP11 are turned off.

Accordingly, the drain of the transistor QP11 is shifted to a low level (for example, third power supply potential VHB=VBIAS+QP12VTH (threshold voltage)), and the drain of the transistor QP13 is shifted to a high level (first power supply potential VBB). A level-shifted digital dimming signal PWM is output from the drain of the transistor QP13.

Figure 4:
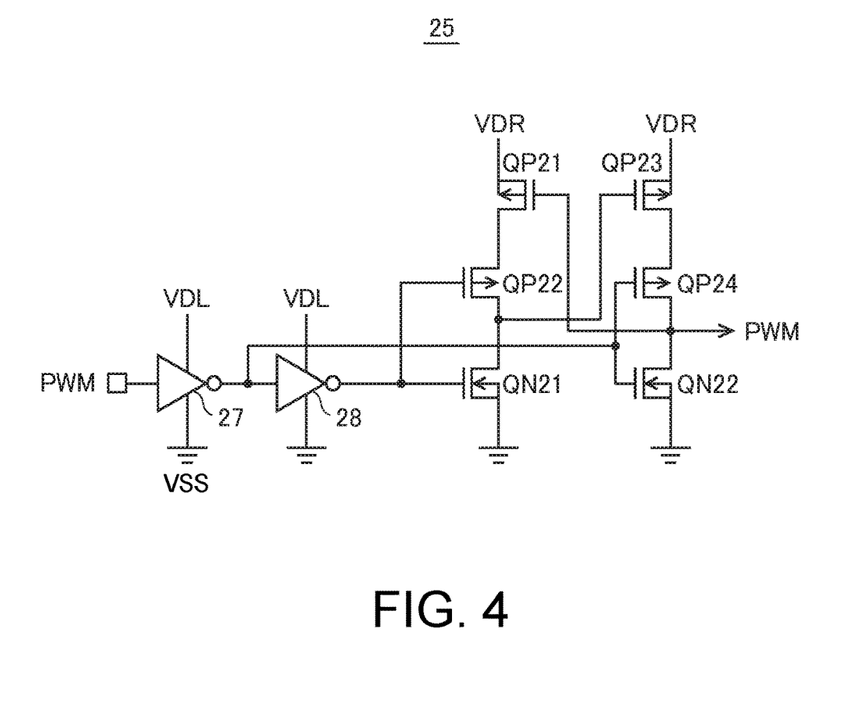
FIG. 4 is a circuit diagram showing a configuration example of a second level shifter shown in FIG. 2.

FIG. 4 is a circuit diagram showing a configuration example of the second level shifter shown in FIG. 2. As shown in FIG. 4, the second level shifter 25 includes inverters 27 and 28, P-channel MOS transistors QP21 to QP24, and N-channel MOS transistors QN21 and QN22.

The transistors QP21 and QP22, and the transistor QN21 are connected in series between the wiring of the first power supply potential VBB and the wiring of the second power supply potential VSS. The transistors QP23 and QP24, and the transistor QN22 are connected in series between the wiring of the first power supply potential VBB and the wiring of the second power supply potential VSS.

The gate of the transistor QP21 is connected to the drain of the transistor QP24 and the drain of the transistor QN22, and the gate of the transistor QP23 is connected to the drain of the transistor QP22 and the drain of the transistor QN21. An output signal of the inverter 28 is supplied to the gates of the transistors QP22 and QN21, and an output signal of the inverter 27 is supplied to the gates of the transistors QP24 and QN22.

Each of the inverters 27 and 28 performs operation by receiving a supply of a power supply potential VDL for a logic circuit and the second power supply potential VSS, inverts the input signal, and generates an output signal. The transistors QP22 and QN21 are turned on or off according to the output signal of inverter 28, and the transistors QP24 and N22 are turned on or off according to the output signal of the inverter 27.

For example, when the digital dimming signal PWM is shifted to a high level, the output signal of the inverter 27 is shifted to a low level, and the output signal of the inverter 28 is shifted to a high level. As a result, the transistors QN21 and QP24 are turned on, and the transistor QP23 is also turned on. On the other hand, the transistors QN22 and QP22 are turned off, and the transistor QP21 is also turned off.

Accordingly, the drain of the transistor QP22 is shifted to a low level (second power supply potential VSS), and the drain of the transistor QP24 is shifted to a high level (fourth power supply potential VDR). A level-shifted digital dimming signal PWM is output from the drain of the transistor QP24.

Figure 5:
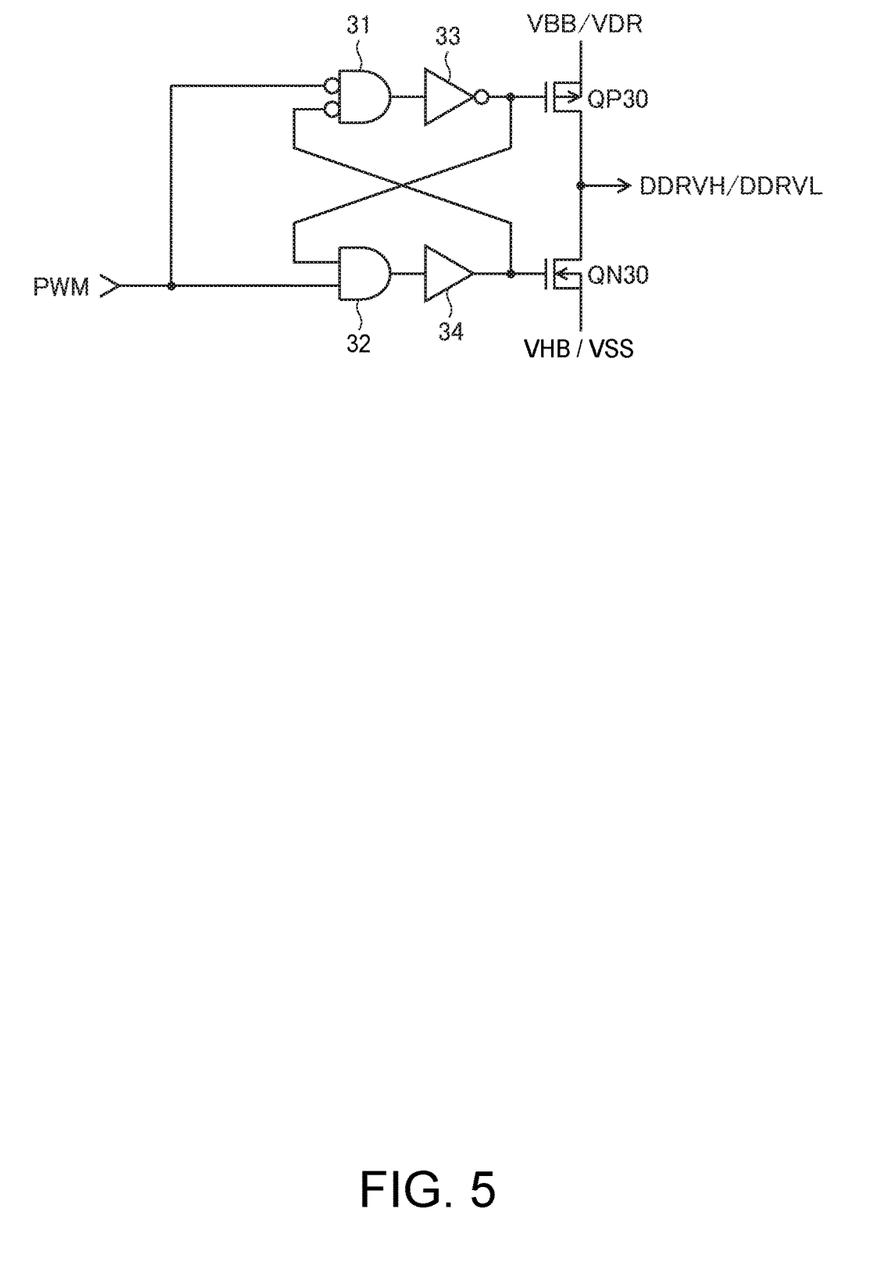
FIG. 5 is a circuit diagram showing a configuration example of a first or second output circuit shown in FIG. 2.

FIG. 5 is a circuit diagram showing a configuration example of the first or second output circuit shown in FIG. 2. As shown in FIG. 5, the first output circuit 24 or the second output circuit 26 includes an NOR circuit 31, an AND circuit 32, an inverter 33, a buffer circuit 34, a P-channel MOS transistor QP30, and an N-channel MOS transistor QN30. The NOR circuit 31, the AND circuit 32, the inverter 33, and the buffer circuit 34 are provided to prevent the transistors QP30 and QN30 from being simultaneously turned on.

The NOR circuit 31 includes an input terminal that receives an input of the digital dimming signal PWM that is supplied from the first level shifter 23 or the second level shifter 25 shown in FIG. 2, and an input terminal that receives an input of an output signal of the buffer circuit 34. Accordingly, when the digital dimming signal PWM and the output signal of the buffer circuit 34 are at a low level, the NOR circuit 31 outputs a high-level output signal to the inverter 33, and the inverter 33 outputs a low-level output signal to the gate of the transistor QP30. As a result, the transistor QP30 is turned on.

The AND circuit 32 includes an input terminal that receives an input of the digital dimming signal PWM supplied from the first level shifter 23 or the second level shifter 25 shown in FIG. 2, and an input terminal that receives an input of an output signal of the inverter 33. Accordingly, when the digital dimming signal PWM and the output signal of the inverter 33 are at a high level, the AND circuit 32 outputs a high-level output signal to the buffer circuit 34, and the buffer circuit 34 outputs a high-level output signal to the gate of the transistor QN30. As a result, the transistor QN30 is turned on.

In the case of the first output circuit 24, the first power supply potential VBB is supplied to the source of the transistor QP30, the third power supply potential VHB is supplied to the source of the transistor QN30, and the first control signal DDRVH is output from the drains of the transistors QP30 and QN30.

In the case of the second output circuit 26, the fourth power supply potential VDR is supplied to the source of the transistor QP30, the second power supply potential VSS is supplied to the source of the transistor QN30, and the second control signal DDRVL is output from the drains of the transistors QP30 and QN30.

Second Embodiment

In a second embodiment, the first driving circuit 21 shown in FIG. 1 outputs the first control signal DDRVH to the first terminal P1 so as to charge the capacitor C4 at the time when the semiconductor device 100 is powered on or the like (hereinafter referred to as "at the time of startup"), and supplements electric charges to the capacitor C4 during the subsequent normal operation.

Figure 6:
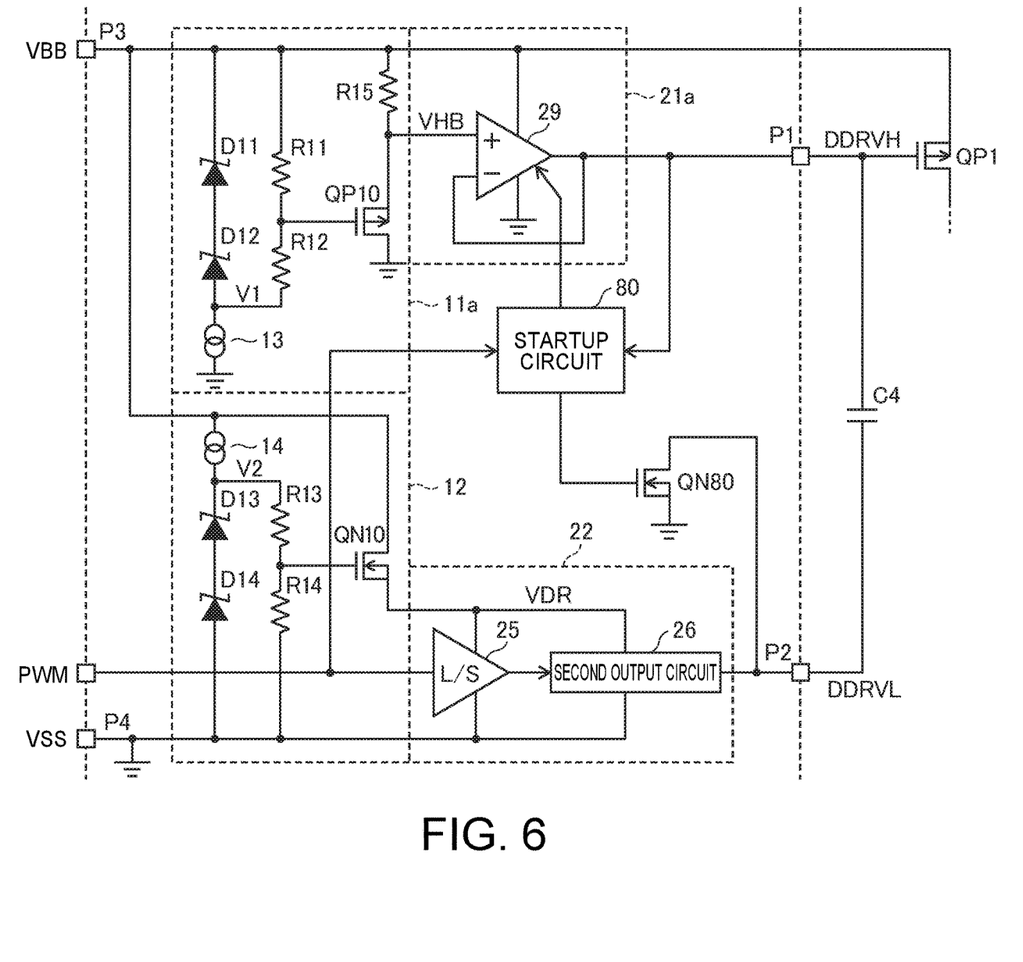
FIG. 6 is a circuit diagram showing a configuration example of a portion of a semiconductor device according to a second embodiment of the invention.

FIG. 6 is a circuit diagram showing a configuration example of a portion of a semiconductor device according to a second embodiment of the invention. The second embodiment is configured by replacing the first regulator 11 and the first driving circuit 21 of the first embodiment shown in FIG. 2 with a first regulator 11a and a first driving circuit 21a, and adding a startup circuit 80 and an N-channel MOS transistor QN80. Other than the above, the second embodiment may be configured in the same manner as the first embodiment.

As shown in FIG. 6, in the first regulator 11a, a resistor R15 is connected between the wiring of the first power supply potential VBB and the source of the transistor QP10. The first regulator 11a generates a third power supply potential VHB based on the first power supply potential VBB and the second power supply potential VSS, as with the first regulator 11 of the first embodiment shown in FIG. 2.

The first driving circuit 21a includes an operational amplifier 29 whose operation is controlled by the startup circuit 80. The operational amplifier 29 outputs the third power supply potential VHB to the first terminal P1 as a first control signal DDRVH by buffering the third power supply potential VHB when it is in operation, and brings the output terminal into a high impedance state when it is not in operation.

The startup circuit 80 performs control so as to turn on the transistor QN80 for a predetermined period of time according to, for example, a power-on-reset signal that is activated by a power-on-reset circuit included in the semiconductor device 100 at the time of startup so as to fix the potential of the second terminal P2 to the second power supply potential VSS, and also performs control so as to bring the operational amplifier 29 into an operation state. As a result, the first control signal DDRVH is output to the first terminal P1, and the capacitor C4 is charged.

Also, the startup circuit 80 monitors the voltage of the first terminal P1 during normal operation. For example, the startup circuit 80 includes a comparator or the like that compares the voltage of the first terminal P1 with a predetermined voltage, and monitors the voltage of the first terminal P1 while the second control signal DDRVL is set to a low level by the second driving circuit 22 in synchronization with the digital dimming signal PWM.

If it is detected that the voltage of the first terminal P1 has fallen below a predetermined voltage, the startup circuit 80 performs control such that the operational amplifier 29 is in operation for a predetermined length of time. As a result, the first control signal DDRVH (third power supply potential VHB) is output to the first terminal P1, and the capacitor C4 is charged. The capacitor C4 is charged while the second control signal DDRVL is set to a low level by the second driving circuit 22.

After that, when the second driving circuit 22 sets the second control signal DDRVL to a high level, the potential of the first terminal P1 is pumped up from the third power supply potential VHB to the first power supply potential VBB by the capacitor C4 if the above expression (1) is satisfied. As a result, the first power supply potential VBB is applied to the gate of the transistor QP1, and the transistor QP1 is turned off.

Alternatively, the startup circuit 80 may include a timer, a counter or the like that performs operation in synchronization with the clock signal, and may perform control such that the operational amplifier 29 regularly outputs the first control signal DDRVH to the first terminal P1 while the second control signal DDRVL is set to a low level by the second driving circuit 22. In this case, it is unnecessary to monitor the voltage of the first terminal P1. In either case, even if the electric charges charged in the capacitor C4 are discharged at the time of startup for some reason, it is possible to supplement electric charges to the capacitor C4.

According to the first or second embodiment of the invention, the second control signal DDRVL output from the second driving circuit 22 is supplied, via the capacitor C4, to the gate of the transistor QP1 that controls the electric current flowing through the light emitting element 110. Accordingly, the waveform of the gate voltage of the transistor QP1 can be improved without increasing the driving ability of the first driving circuit 21. It is therefore possible to achieve highly accurate digital dimming by shortening the rise time or the fall time of the gate voltage of the transistor QP1 without increasing noise or electric power consumption when the light emitting element 110 is PWM driven for digital dimming.

Third Embodiment

In a third embodiment, a method similar to the method for shortening the rise time or the fall time of the gate voltage of the transistor QP1 for digital dimming according to the first embodiment is used to shorten the rise time or the fall time of the gate voltage of the transistor QN1 for analog dimming.

Figure 7:
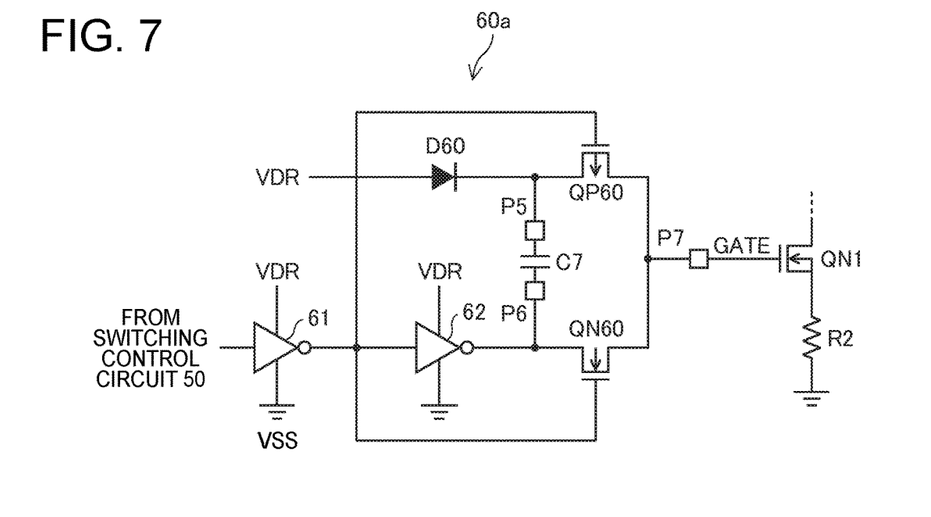
FIG. 7 is a circuit diagram showing a configuration example of a portion of a semiconductor device according to a third embodiment of the invention.

FIG. 7 is a circuit diagram showing a configuration example of a portion of a semiconductor device according to a third embodiment of the invention. In the third embodiment, a drive circuit 60a is used instead of the drive circuit 60 shown in FIG. 1. Other than the above, the third embodiment may be configured in the same manner as the first or second embodiment.

The drive circuit 60a includes inverters 61 and 62, a diode D60, a P-channel MOS transistor QP60, and an N-channel MOS transistor QN60. An external capacitor C7 is connected between the source of the transistor QP60 and the source of the transistor QN60 via two terminals P5 and P6 of the semiconductor device.

The transistor QP60 includes a source that receives a supply of the fourth power supply potential VDR via the diode D60, a drain that is connected to a terminal P7 of the semiconductor device, and a gate that receives a supply of an output signal of the inverter 61. The transistor QN60 includes a source that receives a supply of an output signal of the inverter 62, a drain that is connected to the terminal P7, and a gate that receives a supply of the output signal of the inverter 61.

Each of the inverters 61 and 62 performs operation by receiving a supply of the fourth power supply potential VDR and the second power supply potential VSS, inverts the input signal, and generates an output signal. When the output signal of the switching control circuit 50 is shifted to a high level, the output signal of the inverter 61 is shifted to a low level, and the output signal of the inverter 62 is shifted to a high level. The output signal of the inverter 62 is supplied to the source of the transistor QP60 via the capacitor C7, and thus the source potential of the transistor QP60 increases to about two fold of the fourth power supply potential VDR.

Also, when the output signal of the inverter 61 is shifted to a low level, the transistor QP60 is turned on, and the transistor QN60 is turned off. A third control signal GATE that is at a high level is output to the gate of the transistor QN1. Accordingly, the transistor QN1 is turned on. The high level of the third control signal GATE increases to about two fold of the fourth power supply potential VDR, and it is therefore possible to shorten the rise time of the gate voltage of the transistor QN1, and reduce the on-resistance of the transistor QN1.

When the output signal of the switching control circuit 50 is shifted to a low level, the output signal of the inverter 61 is shifted to a high level, and the output signal of the inverter 62 is shifted to a low level. As a result of the output signal of the inverter 61 being shifted to a high level, the transistor QN60 is turned on, and the transistor QP60 is turned off, whereby a third control signal GATE that is at a low level is supplied to the gate of the transistor QN1. Accordingly, the transistor QN1 is turned off.

Variation of Light Emission Control Circuit

Next, a variation of the light emission control circuit that includes the semiconductor device according to any one of the embodiments of the invention will be described with reference to FIG. 1. In the case where a plurality of light emitting elements 110 are used, in order to control the light emission operations of the light emitting elements 110, a plurality of semiconductor devices and a plurality of sets of external components are provided in the light emission control circuit.

Accordingly, the light emission control circuit includes a plurality of transistors QP1 that respectively control the electric currents that flow through the plurality of light emitting elements 110, a plurality of capacitors C4 that have one ends that are respectively connected to the gates of the plurality of transistors QP1, and a plurality of semiconductor devices that respectively control the plurality of transistors QP1.

For example, in the case where first to fourth light emitting elements 110 are used, first to fourth transistors QP1 that respectively control the electric currents that flow through the first to fourth light emitting elements 110, first to fourth capacitors C4 that have one ends that are respectively connected to the gates of the first to fourth transistors QP1, and first to fourth semiconductor devices that respectively control the first to fourth transistors QP1 are provided in the light emission control circuit.

As with the semiconductor device 100 shown in FIG. 1, the first semiconductor device includes a first regulator 11 and a second regulator 12, but in the second to fourth semiconductor devices, the first regulator 11 and the second regulator 12 may be omitted, or may be configured to not perform operation.

The first regulator 11 of the first semiconductor device generates, based on the first power supply potential VBB and the second power supply potential VSS, a third power supply potential VHB that is lower than the first power supply potential VBB but higher than the second power supply potential VSS, and supplies the third power supply potential VHB to the first driving circuits 21 and the like of the first to fourth semiconductor devices.

Also, the second regulator 12 of the first semiconductor device generates, based on the first power supply potential VBB and the second power supply potential VSS, a fourth power supply potential VDR that is lower than the third power supply potential VHB but higher than the second power supply potential VSS, and supplies the fourth power supply potential VDR to the second driving circuits 22 and the like of the first to fourth semiconductor devices.

According to this variation, in a light emission control circuit that includes a plurality of semiconductor devices for controlling the light emission operations of a plurality light emitting elements 110, a third power supply potential VHB and a fourth power supply potential VDR that are respectively generated by a first regulator 11 and a second regulator 12 of one semiconductor device are shared among the plurality of semiconductor devices. Therefore, the third power supply potential VHB and the fourth power supply potential VDR used in the plurality of semiconductor devices can be uniform, and reduce the number of capacitors C2 and C3 that smooth the third power supply potential VHB and the fourth power supply potential VDR.

Electronic Appliance

Next, a video projector will be described as an example of an electronic appliance according to an embodiment of the invention.

Figure 8:
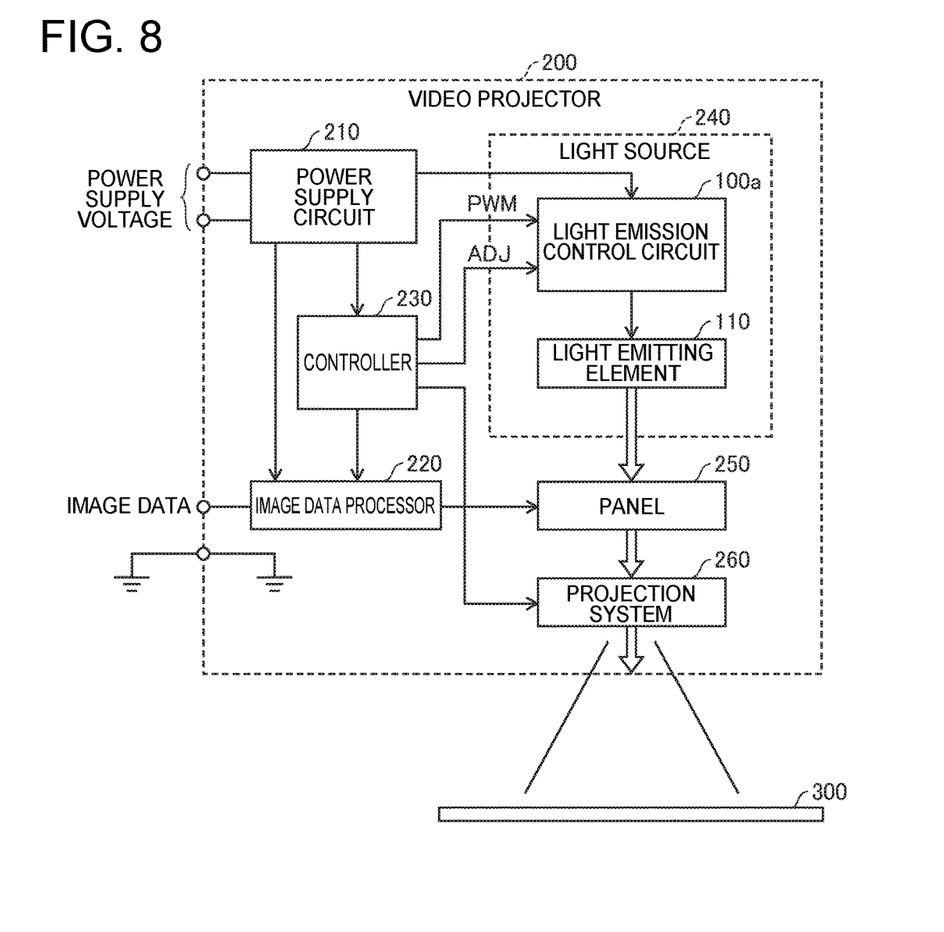
FIG. 8 is a block diagram showing a configuration example of a video projector.

FIG. 8 is a block diagram showing a configuration example of a video projector. A video projector 200 is a display apparatus that receives a supply of a power supply voltage from the outside, and also receives a supply of image data from an image data supply apparatus such as a personal computer or a video player, and projects an image onto a screen (projection surface) 300 based on the image data.

As shown in FIG. 8, the video projector 200 includes a power supply circuit 210, an image data processor 220, a controller 230, a light source 240, a panel 250, and a projection system 260. The light source 240 includes a light emission control circuit 100a and a light emitting element 110 as shown in FIG. 1.

The power supply circuit 210 generates, for example, a relatively low logic power supply voltage based on a power supply voltage of AC 100 V that is supplied from the outside, and supplies the logic power supply voltage to the image data processor 220, the controller 230, and the like, and at the same time, generates a relatively high power supply voltage (VBB–VSS), and supplies the power supply voltage to the light emission control circuit 100a of the light source 240.

The image data processor 220 and the controller 230 may be, for example, microcomputers or the like. The image data processor 220 generates a display image signal and a synchronization signal by processing the image data that has been supplied from the outside, and supplies the image signal and the synchronization signal to the panel 250 so as to drive the panel 250 and perform rendering.

The controller 230 controls the constituent elements of the video projector 200 according to the operation of an operator performed through a remote controller or an operation panel (not shown). If the operator provides a request to perform dimming, the controller 230 generates a digital dimming signal PWM and an analog dimming signal ADJ required to carry out dimming requested by the operator, and supplies the digital dimming signal PWM and the analog dimming signal ADJ to the light emission control circuit 100a of the light source 240.

The light source 240 emits light at a brightness level according to the digital dimming signal PWM and the analog dimming signal ADJ supplied from the controller 230, and applies the light to the panel 250. For example, in the case where the light emitting element 110 includes a plurality of laser diodes that generate blue light, the light source 240 may further include a phosphor that receives blue light generated by some of the laser diodes and generate yellow light, and a spectrometer that separates red light and green light from the yellow light according to the wavelength. In this case, the light source 240 can emit three colors of light such as R (red), G (green), and B (blue).

The panel 250 modulates the light applied from the light source 240 according to the image signal and the synchronization signal supplied from the image data processor 220. For example, the panel 250 may include three liquid crystal panels that correspond to three colors of RGB. Each liquid crystal panel forms an image by changing the light transmittance of a plurality of pixels arranged in a matrix. The modulation light obtained through modulation performed by the panel 250 is guided to the projection system 260.

The projection system 260 includes at least one lens. For example, a projection lens that is a group of lenses for projecting and imaging the modulation light obtained through modulation performed by the panel 250 onto the screen 300, and various types of mechanisms that change the aperture, zoom, shift position, and the like of the projection lens are provided in the projection system 260. These mechanisms are controlled by the controller 230. As a result of the projection system 260 projecting the modulation light onto the screen 300, an image is displayed on the screen 300.

According to the present embodiment, it is possible to provide an electronic appliance that can accurately adjust the brightness level of the light emitting element 110 by using the light emission control circuit 100a that can achieve highly accurate digital dimming without increasing noise or electric power consumption when the light emitting element 110 is PWM driven for digital dimming.

In the embodiment given above, a video projector has been described as an example of the electronic appliance of the invention. However, the invention is applicable to various types of electronic appliances that include a light source. As described above, the invention is not limited to the embodiments given above, and a variety of modifications can be made by those skilled in the art within the technical concept of the invention.

This application claims priority from Japanese Patent Application No. 2017-049703 filed in the Japanese Patent Office on Mar. 15, 2017, the entire disclosure of which is hereby incorporated by reference in its entirely.

What is claimed is:

1. An electronic appliance comprising:
   a light source that outputs light;
   an optical modulator that modulates light emitted by the light source and outputs image light; and
   a projection system that projects the light modulated by the light modulator,
   wherein the light source includes:
   a laser diode;
   a transistor that controls an electric current that flows through the laser diode;
   a capacitor that has one end connected to a gate of the transistor; and
   a semiconductor device that includes a first terminal that is connected to the gate of the transistor and the one end of the capacitor, a second terminal that is connected to the other end of the capacitor, a first driving circuit that outputs a first control signal to the first terminal, and a second driving circuit that, configure to control the transistor in an on-state or an off-state, activates or deactivates a second control signal, and outputs the second control signal to the second terminal, the second control signal having a potential lower than a potential of the first control signal.

2. A semiconductor device that controls a transistor that controls an electric current that flows through a light emitting element, the transistor including a gate that is connected to one end of a capacitor, the semiconductor device comprising:
   a first terminal that is connected to the gate of the transistor and the one end of the capacitor;
   a second terminal that is connected to the other end of the capacitor;
   a first driving circuit that outputs a first control signal to the first terminal; and
   a second driving circuit that, in order to control the transistor in an on-state or an off-state, activates or deactivates a second control signal, and outputs the second control signal to the second terminal, the second control signal having a potential lower than a potential of the first control signal.

3. The semiconductor device according to claim 2,
   wherein the first driving circuit activates or deactivates the first control signal in phase with the second control signal.

4. The semiconductor device according to claim 3,
   wherein the first driving circuit generates the first control signal that has an amplitude substantially equal to an amplitude of the second control signal.

5. The semiconductor device according to claim 2, further comprising:
   a third terminal that receives a supply of a first power supply potential;
   a fourth terminal that receives a supply of a second power supply potential that is lower than the first power supply potential;
   a first regulator that generates, based on the first power supply potential and the second power supply potential, a third power supply potential that is lower than the first power supply potential but higher than the second power supply potential; and
   a second regulator that generates, based on the first power supply potential and the second power supply potential, a fourth power supply potential that is lower than the third power supply potential but higher than the second power supply potential,
   wherein the first driving circuit includes a first level shifter that shifts a level of an input signal, and generates an output signal that transitions between the first power supply potential and the third power supply potential, and a first output circuit that generates the first control signal based on the output signal of the first level shifter, and outputs the first control signal to the first terminal, and
   the second driving circuit includes a second level shifter that shifts the level of the input signal, and generates an output signal that transitions between the fourth power supply potential and the second power supply potential, and a second output circuit that generates the second control signal based on the output signal of the second level shifter, and outputs the second control signal to the second terminal.

6. A light emission control circuit comprising:
   a transistor that controls an electric current that flows through a light emitting element;
   a capacitor that includes one end connected to a gate of the transistor, and has a capacitance larger than a capacitance of the gate of the transistor; and
   the semiconductor device according to claim 2 that controls the transistor.

7. A light emission control circuit comprising:
   a first transistor that controls an electric current that flows through a first light emitting element;
   a first capacitor that includes one end connected to a gate of the first transistor;
   a first semiconductor device that controls the first transistor and is the semiconductor device according to claim 2;
   a second transistor that controls an electric current that flows through a second light emitting element;
   a second capacitor that includes one end connected to a gate of the second transistor; and
   a second semiconductor device that controls the second transistor and is the semiconductor device according to claim 2,
   wherein one of the first semiconductor device and the second semiconductor device includes:
   a first regulator that generates, based on a first power supply potential and a second power supply potential, a third power supply potential that is lower than the first power supply potential but higher than the second power supply potential, and supplies the third power supply potential to the first driving circuit of the first semiconductor device and the first driving circuit of the second semiconductor device; and a second regulator that generates, based on the first power supply potential and the second power supply potential, a fourth power supply potential that is lower than the third power supply potential but higher than the second power supply potential, and supplies the fourth power supply potential to the second driving circuit of the first semiconductor device and the second driving circuit of the second semiconductor device.

8. An electronic appliance comprising:

a light emitting element, or a first light emitting element and a second light emitting element; and the light emission control circuit according to claim 6 that controls a light emission operation of the light emitting element, or light emission operations of the first light emitting element and the second light emitting element.

* * * * *